United States Patent [19]
Ray

[11] 3,738,188
[45] June 12, 1973

[54] POWER TRANSMISSION BELT AND METHOD OF MAKING SAME

[75] Inventor: Robert L. Ray, Springfield, Mo.

[73] Assignee: Dayco Corporation, Dayton, Ohio

[22] Filed: Mar. 1, 1971

[21] Appl. No.: 119,643

[52] U.S. Cl. .................. 74/234, 74/237, 156/138, 156/140
[51] Int. Cl. .......... F16g 5/00, F16g 1/22, B29h 7/22
[58] Field of Search ................. 74/233, 234, 231 C, 74/229, 237; 156/138, 140

[56] References Cited
UNITED STATES PATENTS
1,028,783   6/1912   Von Rabenau ...................... 74/234
2,350,691   6/1944   Mauroner ........................ 74/234 X FOREIGN PATENTS OR APPLICATIONS
1,034,138   7/1953   France ................................. 74/234

Primary Examiner—Leonard H. Gerin
Attorney—Reuben Wolk

[57] ABSTRACT

An endless power transmission belt and method of making same is provided wherein the belt has a load-carrying section and a pair of opposed sides arranged adjacent opposite ends of the load-carrying section with each of the sides having raised surface portions which are adapted to engage the walls of an associated sheave to control the traction properties of the belt operating in such sheave. The belt may also be provided with raised surface portions or a tooth-like configuration on the top and/or bottom thereof to provide increased belt flexibility.

18 Claims, 11 Drawing Figures

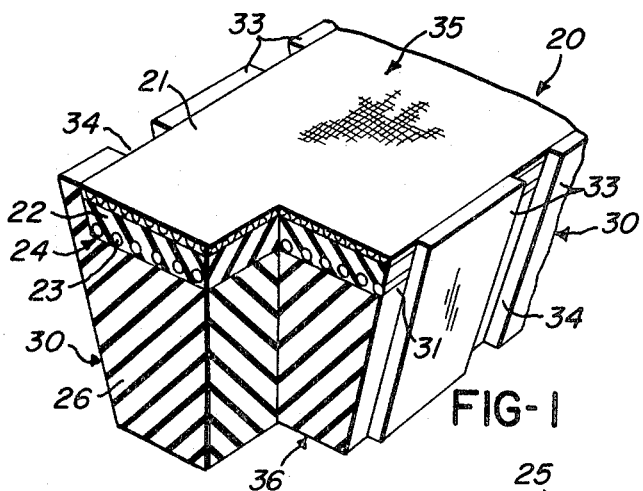
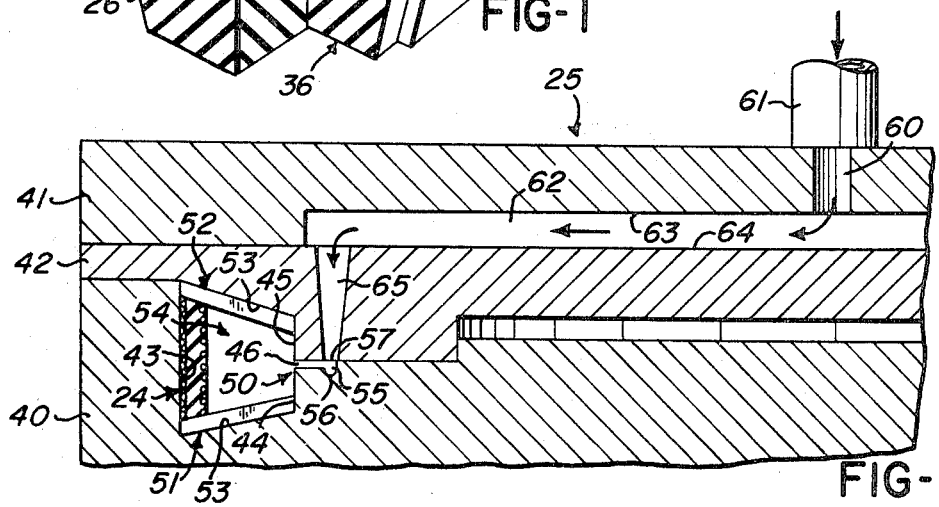
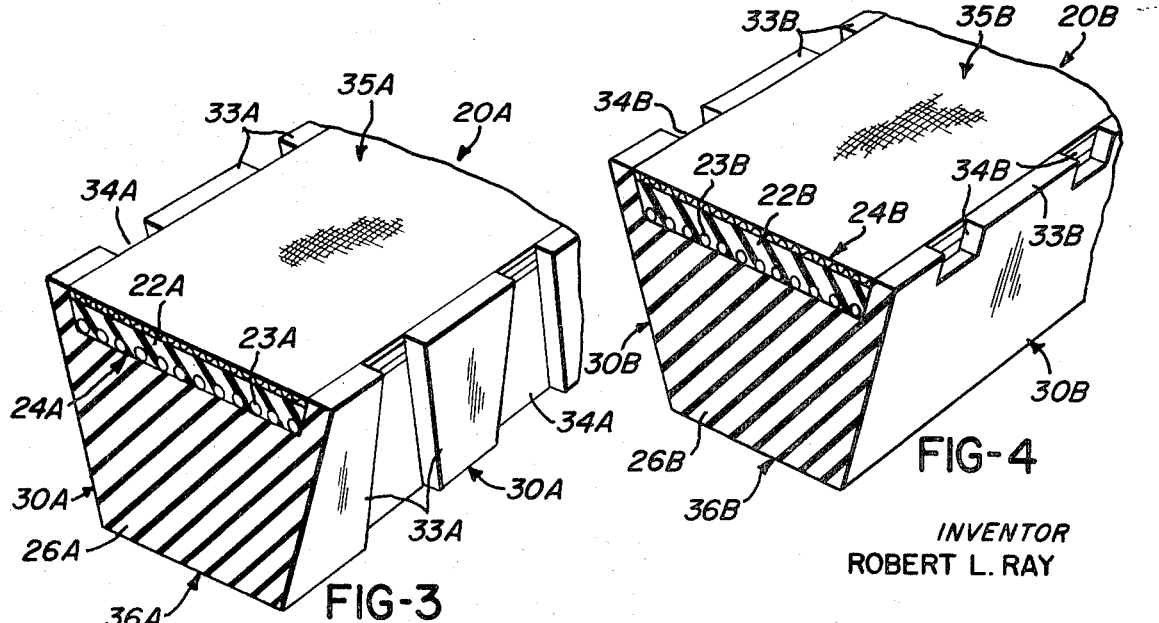

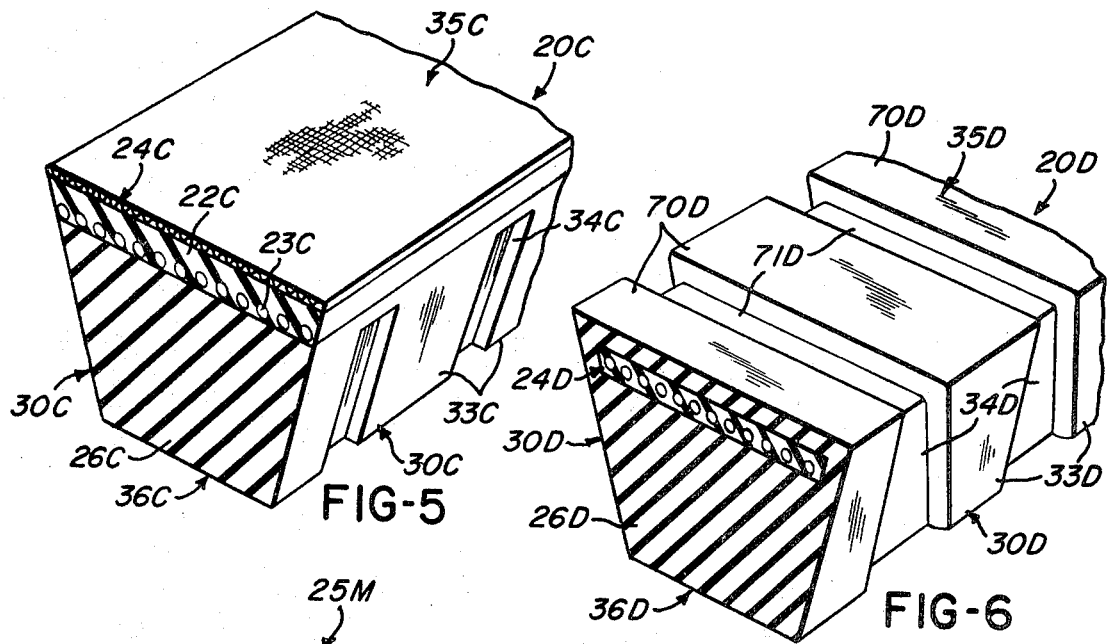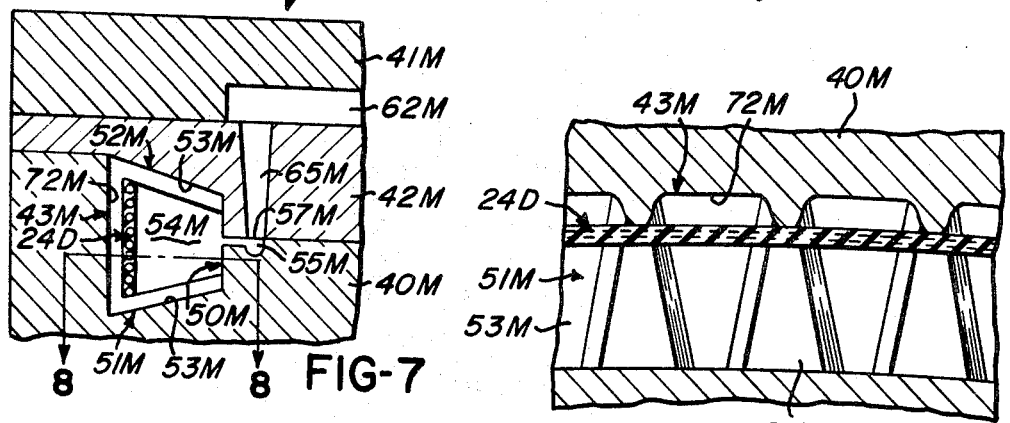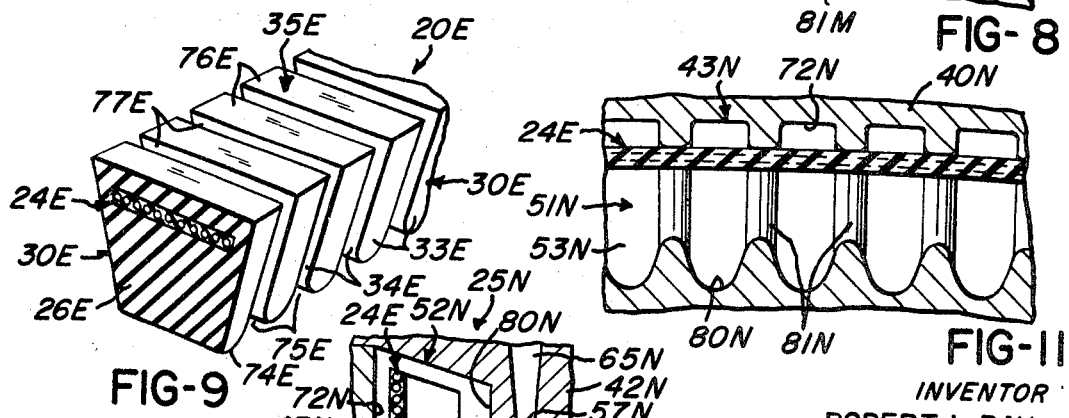

POWER TRANSMISSION BELT AND METHOD OF MAKING SAME

BACKGROUND OF THE INVENTION

Endless power transmission belts such as V-belts, for example, are in current use which have comparatively uninterrupted side surfaces which engage annular surfaces of associated sheaves and provide maximum surface contact whereby it is difficult to use these belts in applications where each belt is operating at variable speeds. In addition, current V-belts are comparatively stiff and provide poor performance in applications where idlers, reverse bend pulleys, and the like also engage the belts.

Further, with the methods proposed heretofore for making V-belts, an assembly is made for insertion in a mold and such assembly includes a load-carrying section or component and is placed in the mold with only one surface exposed. The remaining portion of an associated belt is then molded against such exposed surface. The construction of such assembly is often determined by the desired location of the load-carrying component in the completed belt whereby it is often necessary to compromise desired belt characteristics.

SUMMARY

This invention provides an improved power transmission belt, and method of making same, wherein such belt is comparatively cool running, has improved flexibility, and has a load-carrying section which may be of minimum thickness and precisely positioned between the top and bottom surfaces of the belt, as viewed in cross section.

In particular, the belt has a pair of opposed sides arranged adjacent opposite ends of the load-carrying section with each of the sides having raised surface portions which are adapted to engage the walls of an associated sheave to control the traction properties of the belt operating in such sheave. The belt may also be provided with raised surface portions or a tooth-like configuration on the top and/or bottom thereof to provide increased belt flexibility.

Other details, uses, and advantages of this invention will be readily apparent from the exemplary embodiments thereof presented in the following specification, claims, and drawings.

BRIEF DESCRIPTION OF THE DRAWINGS

The accompanying drawings show present exemplary embodiments of this invention, in which FIG. 1 is a fragmentary perspective view illustrating one exemplary embodiment of the power transmission belt of this invention;

FIG. 2 is a fragmentary cross-sectional view illustrating an exemplary apparatus and method which may be used to make the belt of FIG. 1;

FIG. 2 is a fragmentary perspective view illustrating another exemplary embodiment of the belt of this invention;

FIG. 4 is a fragmentary perspective view illustrating another exemplary embodiment of the belt of this invention;

FIG. 5 is a fragmentary perspective view of another exemplary embodiment of the belt of this invention which has raised surface portions comprising its lower portion;

FIG. 6 is a fragmentary perspective view illustrating still another embodiment of the belt of this invention having raised surface portions extending across the full height of its sides and across the full width of its top portion;

FIG. 7 is a fragmentary perspective view of an apparatus similar to the apparatus of FIG. 2 and particularly adapted to make the belt of FIG. 6;

FIG. 8 is an enlarged cross-sectional view taken on the line 8—8 of FIG. 7 and particularly illustrating the manner in which a load-carrying assembly or section is precisely positioned in the apparatus of FIG. 7;

FIG. 9 is a fragmentary perspective view illustrating another exemplary embodiment of a belt of this invention which has raised surface portions extending along the full height of its sides as well as across the full width of its top and bottom;

FIG. 10 is a fragmentary perspective view of a portion of an apparatus which may be used to make the belt of FIG. 9; and FIG. 11 is an enlarged view taken essentially on the line 11—11 of FIG. 10.

DESCRIPTION OF ILLUSTRATED EMBODIMENTS

Reference is now made to FIG. 1 which illustrates one exemplary embodiment of a power transmission or V-belt of this invention which is designated generally by the reference numeral 20. The belt 20 has a roughly trapezoidal cross-sectional outline and has a rubber-impregnated fabric cover 21 comprising the top thereof, a tension section 22 bonded to the cover 21, and a load-carrying section or spirally wound cord 23 which adjoins the tension section 22 and is partially embedded therein. The fabric cover 21, tension section 22, and load-carrying cord 23 may be suitably bonded together using any known technique to define an assembly or insert section 24. The insert 24 is placed in a suitable apparatus such as the injection molding apparatus or mold 25 shown in FIG. 2 whereupon a compression section 26 comprising the belt 20 is bonded thereagainst by injection molding an elastomeric material against the insert 24 in a manner to be subsequently described.

The belt 20 has a pair of sides 30 arranged adjacent the opposite end edges 31 of the load-carrying section or cord 23 and each of the sides 30 has raised outer surface portions 33 which are adapted to engage a wall of an associated sheave to control the traction properties of the belt operating in such sheave. The raised surface portions 33 are defined by recesses 34 provided in the belt 20 and each of such recesses extends completely across its associated side 30. In particular, each recess 34 extends the full vertical height of the belt 20, as viewed in cross section, between the top 35 and the bottom 36 of such belt and each recess 34 has a rectangular configuration or outline.

The belt 20 may be made using method steps which will apear hereinafter and utilizing the mold 25, refer to FIG. 2. The mold 25 is comprised of a bottom member 40, a top member 41 and an intermediate member 42. The bottom member 40 has a cylindrical surface or wall 43 and another cylindrical surface or wall 44 arranged concentrically within and in spaced relation from wall 43. The intermediate member 42 also has a cylindrical surface or wall 45 which is substantially identical to wall 44 and is arranged in vertically aligned relation above wall 44. The walls 44 and 45 cooperate to define what will be refered to as an inner or second wall which will be designated by the general reference numeral 50. The members 40 and 42 also have cooperating annular surface portions which are arranged in spaced relation to define an annular slit 46 therebetween.

The bottom member 40 has an annular wall 51 while the intermediate member 42 has a similar annular wall 52 and the walls 51 and 52 cooperate with walls 43 and 50 to define a mold cavity 54 in the mold 25. The walls 51 and 52 are adapted to define opposed sides 30 of the belt 20 and each annular wall 50 and 51 has cutouts 53 provided therein at regular intervals with each cutout 53 being adapted to define a corresponding raised surface portion 33 on the side of the belt 20 formed within the mold cavity 54.

The mold 25 has an annular runner 55 provided therein in spaced relation from the mold cavity 54 and such runner is defined by an arcuate cutout 56 in the bottom member 40 cooperating with an annular surface portion 57 in the member 42. The runner 55 communicates with the inner end of the annular slit 46. The annular runner 55 enables elastomeric material utilized to define the compression section 26 and raised surface portions 33 of the belt 20 to be injected into practically the entire mold cavity 54 in a simultaneous manner. Thus, the entire belt 20, with the exception of the insert section 24, is formed by the elastomeric material which is injected into the mold cavity.

In order to provide elastomeric material through the annular runner 55 into the mold cavity 54, the upper member 41 of the mold 25 has a sprue 60 which is supplied by a conduit 61 which is in flow communication with a source of suitable elastomeric material which is to be introduced into the mold 25. A plurality of passages 62 are provided in the mold 25 and such passages extend radially from the sprue. Each passage 62 may be defined by a groove 63 provided in the inner portion of the upper mold member 41 cooperating with the top surface 64 of the intermediate mold member 42.

A plurality of vertically extending passages or openings 65 are provided through the intermediate member 42. Each passage 65 has its upper end in flow communication with an associated radially extending passage 62 and its lower end in flow communication with the annular runner 55.

To form the belt 20, members 41 and 42 are moved away from lower member 40 and insert 24 is inserted in the lower portion of the mold cavity 54. The members 41 and 42 are then suitably installed in position in a known manner and the assembled mold 25 is suitably held together in a conventional apparatus such as a press. Elastomeric material under pressure is introduced through the conduit 61 whereupon it flows through the sprue 60, radial passages 62, vertical passages 65, annular runner 55, and slit 46, so that it enters the mold cavity 54 in a substantially simultaneous manner and is molded against the exposed surfaces of the insert section 24.

The elastomeric material thus introduced in cavity 54 defines compression section 26 of belt 20 as well as raised surface portions 33 comprising the sides of such belt 20 and the raised surface portions 33 in this example extend the full vertical height of the belt 20. The elastomeric material injected into the mold cacity 54 is then cured and cooled using any suitable technique known in the art whereupon the belt is removed from the mold 25 in a conventional manner and flash material on the belt 20 defined by annylar slit 46, for example, is suitably trimmed therefrom.

Other exemplary embodiments of this invention are illustrated in FIGS. 3, 4, 5, and 6 of the drawings. The belt illustrated in each of these figures is very similar to the belt 20; therefore, the belt in FIGS. 3, 4, 5, and 6 will be designated generally by the reference numeral 20A, 20B, 20C, and 20D respectively and parts of each belt which are very similar to corresponding parts of the belt 20 will be designated by the same reference numeral as in the belt 20 also followed by its associated letter designation and not described again.

Only those component parts which are substantially different from corresponding parts of the belt 20 will be designated by new reference numerals also followed by an associated letter designation and described in detail. Further, while a detailed description of those component parts of each of the various belts in FIGS. 3–6 which are very similar to corresponding component parts of the belt 20 will not be made, reference may be made to the previous description thereof which is basically fully applicable to each belt 20A–D.

The main difference between the belt 20A, see FIG 3, and the belt 20 is that each of the recesses 34A in belt 20A instead of having a rectangular configuraton has a substantially trapezoidal configuration in which the shorter of the parallel sides is positioned adjacent the top 35A of such belt.

The main difference between the belt 20B, see FIG. 4, and the belt 20 is that the raised surface portions 33B are defined by recesses 34B extending from the top 35B of belt 20B to a location roughly opposite the lower portion of the load-carrying section 23B. Actually, the raised surface portions 33B define the main surface portion of the belt side 30B. Each of the recesses 34B of this example has a substantially rectangular peripheral outline.

The belt 20C is illustrated in FIG. 5 of the drawings and has raised surface portions 33C in its sides 30C which are defined by recesses 34C. The recesses 34C extend from the bottom 36C to a location roughly opposite the lower portion of the load-carrying section 23C. The recesses 34C of the belt 20C are also of roughly rectangular peripheral outline.

The belt 20D illustrated in FIG. 6 is defined by a top 35D, a bottom 36D and opposed sides 30D and such belt has raised surface portions 33D defined by recesses 34D along the sides thereof. In addition, the belt 20D has raised surface portions 70D comprising the top 35D thereof which are defined by recesses 71D in the top portion which extend across the full width of top 35C. Each top recess 71D is adjoined at its opposite sides by associated side recesses 34D and each of the side recesses 34D extends completely across its associated side and has a substantially trapezoidal peripheral outline with the short parallel side of the trapezoidal outline being arranged adjacent the top 35D.

The belt of FIG. 6 may be made utilizing any suitable apparatus and method; however, such belt is preferably made utilizing the mold presented in FIG. 7 and method associated with such mold. The mold of FIG. 7 is very similar to the mold 25 of FIG. 2; therefore, such mold shall be designated generally by the reference numeral 25M and parts of the mold 25M which are very similar to corresponding parts of the mold 25 will be designated by the same numerals as the mold 25 also followed by the letter designation M and not described again. Only those component parts which are substantially different from corresponding parts of the mold 25M will be designated by a new reference numeral also followed by the letter designation M and described in detail.

The main differences between the mold 25 and the mold 25M are that the annular walls 51M and 52M have cutouts 53M therein of trapezoidal outline with the cutouts being provided at regular intervals. Each cutout 53M is adapted to define a corresponding raised surface portion 33D of trapezoidal outline in the side 30D of each belt 20D formed in mold 25M. In addition, the wall 43M of the mold 25M which corresponds to the wall 43 of mold 25 has cutouts 72M provided therein at regular intervals and each cutout 72M is adapted to define an associated raised surface portion 70D in the belt 20D. The cutouts 72M have their opposite ends arranged in alignment with the cutouts 53M provided in the annular walls 51M and 52M.

Another exemplary embodiment of the belt of this invention is illustrated in FIG. 9 of the drawings. The belt illustrated in FIG. 9 is very similar to the belt 20; therefore, in a similar manner as before, such belt will be designated generally by the reference numeral 20E and parts of the belt 20E which are similar to corresponding parts of the belt 20 will be designated by the same reference numeral as in the belt 20 also followed by the letter designation E and not described again. Only those component parts which are substantially different from corresponding parts of the belt 20 will be designated by new reference numerals also followed by the letter designation E and described in detail.

The belt 20E is also of substantially trapezoidal cross-sectional configuration and is comprised of a top 35E, a bottom 36E and opposed sides 30E. The belt 20E has raised surface portions 33E comprising each side 30E and the raised surface portions 33E are defined by recesses 34E of substantially rectangular peripheral outline and each recess 34E extends the full vertical height of its sides 30E.

The belt 20E has a plurality of raised surface portions 74E in the bottom 36E thereof and the raised surface portions 74E are defined by a plurality of recesses 75E in the bottom portion of the belt. The belt 20E also has a plurality of raised surface portions 76E comprising its top 35E and the raised surface portions 76E are defined by recesses 77E in the top portion of such belt.

Each top recess 77E is arranged opposite an associated bottom recess 75E and associated top and bottom recesses 77E and 75E are interconnected at their opposite ends by a pair of side recesses 34E. Thus, it will be seen that the recesses 34E, 75E, and 77E are arranged in a plurality of sets with each set defining an annular groove around the entire periphery of the belt 20E whereby the belt 20E has alternating annular grooves and ridges along the full length thereof, i.e., along its entire endless path.

The belt 20E may be made using any suitable apparatus such as the mold illustrated in FIGS. 10 and 11 of the drawings, for example. The mold of FIGS. 10 and 11 is similar to the mold 25M; therefore, such mold will be designated generally by the reference numeral 25N and parts of the mold 25N which are very similar to corresponding parts of the mold 25M will be designated by the same numeral as the mold 25M also followed by the letter designation N and not described again.

The annular walls 51N and 52N which are adapted to define the sides of the belt 25E have cutouts 53N therein at regular intervals and each cutout is adapted to define a corresponding raised surface portion 33E in the belt 20E. It will also be seen that each cutout 53N has a rectangular peripheral outline rather than a trapezoidal outline as is the case of the cutouts 53M in the mold 25M.

In addition, it will be seen that the wall 43N of the mold 25N which corresponds to the wall 43M of mold 25M has a plurality of cutouts 72N provided therein such define raised surface portions 76E in the belt 20E. Similarly, the wall 50N and mold 25N which corresponds to wall 50M of the mold 25M also has a plurality of cutouts 80N therein at regular intervals and each cutout is adapted to define a corresponding raised surface portion 74E extending from the bottom 36E of the belt 20E formed within mold 25N.

In using the molds 25M and 25N, it will be seen that an associated insert assembly such as 24D and 24E, for example, is simply positioned as determined by the width thereof, i.e., the width of the insert section is such that it resets upon raised projections 81M in the case of mold 25M and similar raised projections 81N in the case of mold 25N. Thus, the load-carrying means or section of such an insert assembly is precisely positioned along the vertical height of the belt and in the completed belt the load-carrying section is precisely located in parallel relation between the parallel sides of the belt as viewed in cross section.

With the above method of placing an insert assembly with its load-carrying section in position in a mold, particular attention may be given to the strength and load-carrying characteristics of the load-carrying section. Thus, it is not necessary to build a comparatively thick insert or assembly in a mold cavity from a position or wall corresponding to the location of either the top or the bottom of the belt in order to precisely locate the load-carrying section in the completed belt.

During the injection of elastomeric material into the mold cavity 54 the cutouts 53 in mold 25 allow easy flow of elastomeric material therein and once such material is cooled and cured define the raised surface portions 33 of the belt 20. Similarly, the cutouts 53M in the mold 25M not only allow material to flow therein but also provide flow channels which allow elastomeric material to flow into the cutouts 72M to define raised surface portions 70D of the belt 20D. In the mold 25N, the cutouts 80N and 53N allow elastomeric material to flow therein and define raised surface portions 34E in the sides 30E of belt 20E and raised surface portions 74E in the bottom of such belt. The cutouts 53N also serve as flow channels allowing elastomeric material to flow into cutouts 72N to define top raised surface portions 76E for the belt 20E.

Apparatus or molds have not been shown for forming the belts 20A, 20B, and 20C of FIGS. 3, 4, and 5 respectively; however, it will be appreciated that each of such belts may be formed in a mold, or the like, having cooperating members which are capable of defining the various belt configurations and in a similar manner as described previously for belts 20, 20D and 20E.

In each of the belts 20, 20A, 20B, 20D, and 20E it will be seen that the side edges of the associated load-carrying section is arranged substantially flush with the inside surface portion of an associated recess whereby such edges are in a protected position away from the rubbing or abrading wear provided by a sheave. However, it will be appreciated that the side edges of the load-carrying section may be flush with the outermost surface portion of an associated belt as in the case of belt 20C.

The belts 20, 20A, 20B, and 20C have rubber-impregnated fabric portions comprising the top thereof; however, it will be appreciated that such belts need not necessarily have fabric portions comprising such top.

The belts 20D and 20E have elastomeric material of the same composition defining the entire belt with the exception of insert section or assembly 24D or 24E respectively. Thus, these belts may be made with optimum economy merely by positioning an insert assembly within a mold having appropriate walls which enable the forming of sides, top, and bottom of the belt and then injection molding a suitable elastomeric material against such insert. Each insert, such as 24D or 24E, may be made of single load-carrying means with or without binding means to enable it to be handled as a unit or such insert may be made of a plurality of components.

Following the injection molding of elastomeric material against an associated insert section in each of the belts 20, 20A, 20B, 20C, 20D, and 20E, the belt is suitably cooled and cured utilizing any technique known in the art to define the completed belt.

While present exemplary embodiments of this invention and methods of practicing the same, have been illustrated and described, it will be recognized that this invention may be otherwise variously embodied and practiced within the scope of the following claims.

What is claimed is:

1. An endless power transmission belt having a generally trapezoidal cross section comprising an inner compression section, an outer tension section, an intermediate load-carrying section having longitudinal strength cords, and a pair of opposed sides, each of said sides having raised surface portions which are adapted to engage a wall of an associated sheave to control the traction properties of said belt operating in said sheave.

2. A sides as set forth in claim 1 in which said raised surface portions are defined by recesses in said belt.

3. An endless power transmission belt having a generally trapezoidal cross section comprising an inner compression section, an outer tension section, an intermediate load-carrying section having longitudinally extending strength cords, and a pair of opposed sides, each of said sides having raised surface portions defined by recesses, and load-carrying section having end edges substantially flush with said recesses, said surface portions adapted to engage a wall of an associated sheave to control the traction properties of said belt operating in said sheave.

4. A belt as set forth in claim 3 in which said recesses extend completely across said sides in a transverse direction.

5. A belt as set forth in claim 4 in which each of said recesses is in the form of a substantially rectangular cutout.

6. A belt as set forth in claim 4 in which each of said recesses is in the form of a substantially trapezoidal cutout.

7. A belt as set forth in claim 3 in which each of said recesses extends from the outermost surface of said belt to a location approximately opposite the inner portion of said load-carrying section.

8. A belt as set forth in claim 3 in which each of said recesses extends from the innermost surface of said belt to a location approximately opposite the outer portion of said load-carrying section.

9. A belt as set forth in claim 3 further comprising a plurality of raised surface portions in the outer surface of said belt defined by additional recesses extending transversely of said entire outer surface.

10. A belt as set forth in claim 9 in which each of said additional recesses is adjoined at its opposite ends by associated side recesses.

11. A belt as set forth in claim 3 comprising a plurality of raised surface portions in the outer and inner surfaces of said belt defined by additional recesses extending transversely of said entire outer and inner surfaces.

12. A belt as set forth in claim 11 in which each outer recess is arranged opposite an associated bottom recess, said associated outer and inner recesses being interconnected at their opposite ends by a pair of side recesses.

13. A method of making an endless V-belt comprising the steps of, providing a mold having an outer wall, an inner wall, and opposed annular walls extending between said outer and inner walls to define a mold cavity, said annular walls being adapted to define opposed sides of said belt with each annular wall having cutouts therein at regular intervals, each cutout being adapted to define a corresponding raised surface portion on the side of a belt formed in said mold cavity, placing load-carrying means for said belt in said cavity, injection molding an elastomeric material against said load-carrying means, and cooling and curing said elastomeric material to define said belt having said raised surface portions which are adapted to engage a wall of an associated sheave to control the traction properties of said belt operating in said sheave.

14. A method as set forth in claim 13 in which said providing step comprises providing said mold having said annular walls which are inclined in a symmetrical manner toward said inner wall, said placing step comprising placing load-carrying means with its opposite edges supported on said annular walls to thereby precisely control the position thereof in said cavity and hence in its associated belt.

15. A method as set forth in claim 14 in which said outer wall has a tooth-like configuration which is adapted to define corresponding raised surface portions and recesses in the top of a belt made using said mold and during said injection molding step said cutouts in said annular walls define flow channels for elastomeric material which is bonded against the surface of said load-carrying means arranged adjacent said outer wall to thereby define said raised surface portions and recesses in the top of the belt.

16. A method as set forth in claim 14 in which said load-carrying means has a limited thickness which is determined solely by its strength requirements and said injection molding step comprising injection molding said elastomeric material against at least one side and opposite end edges of said load-carrying means.

17. A method as set forth in claim 16 in which said injection molding step comprises injection molding said elastomeric material against both sides of said load-carrying means as well as against said opposite end edges.

18. A method as set forth in claim 17 in which said injection molding step comprises injecting said elastomeric material into substantially all parts of said mold cavity in a substantially simultaneous manner through an annular slit.

* * * * *

PO-1050
(5/69)

UNITED STATES PATENT OFFICE
CERTIFICATE OF CORRECTION

Patent No. 3,738,188                     Dated  June 12, 1973

Inventor(s)   Robert L. Ray

It is certified that error appears in the above-identified patent and that said Letters Patent are hereby corrected as shown below:

Column 1, line 58, "FIG. 2" should be --- FIG. 3 ---

Column 4, line 3, "annylar" should be --- annular ---

Column 6, line 15, "50N and mold" should be --- 50N of mold ---

Column 6, line 25, "resets" should be --- rests ---

Column 7, claim 2, line 1, "sides" should be --- belt --- claim 2, line 2, "belt" should be --- sides ---

Signed and sealed this 9th day of April 1974.

(SEAL)
Attest:

EDWARD M.FLETCHER,JR.                C. MARSHALL DANN
Attesting Officer                    Commissioner of Patents